Sept. 15, 1942.  G. M. KRIEGBAUM ET AL  2,296,209
PLANTER
Filed May 10, 1941  3 Sheets-Sheet 1

INVENTORS
GEORGE M. KRIEGBAUM
CLARENCE C. HAAS
BY Paul O. Pippel
ATT'Y

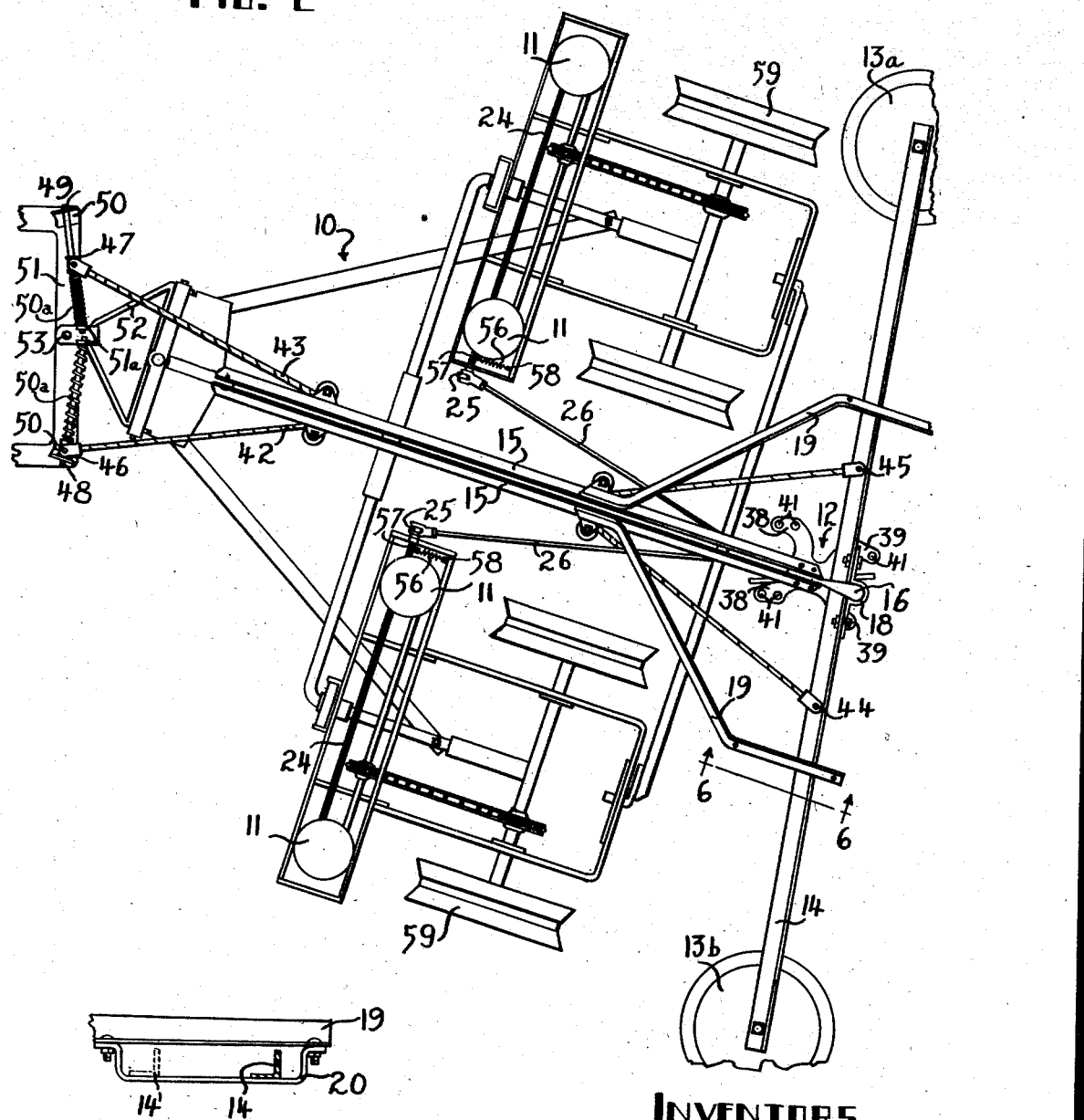

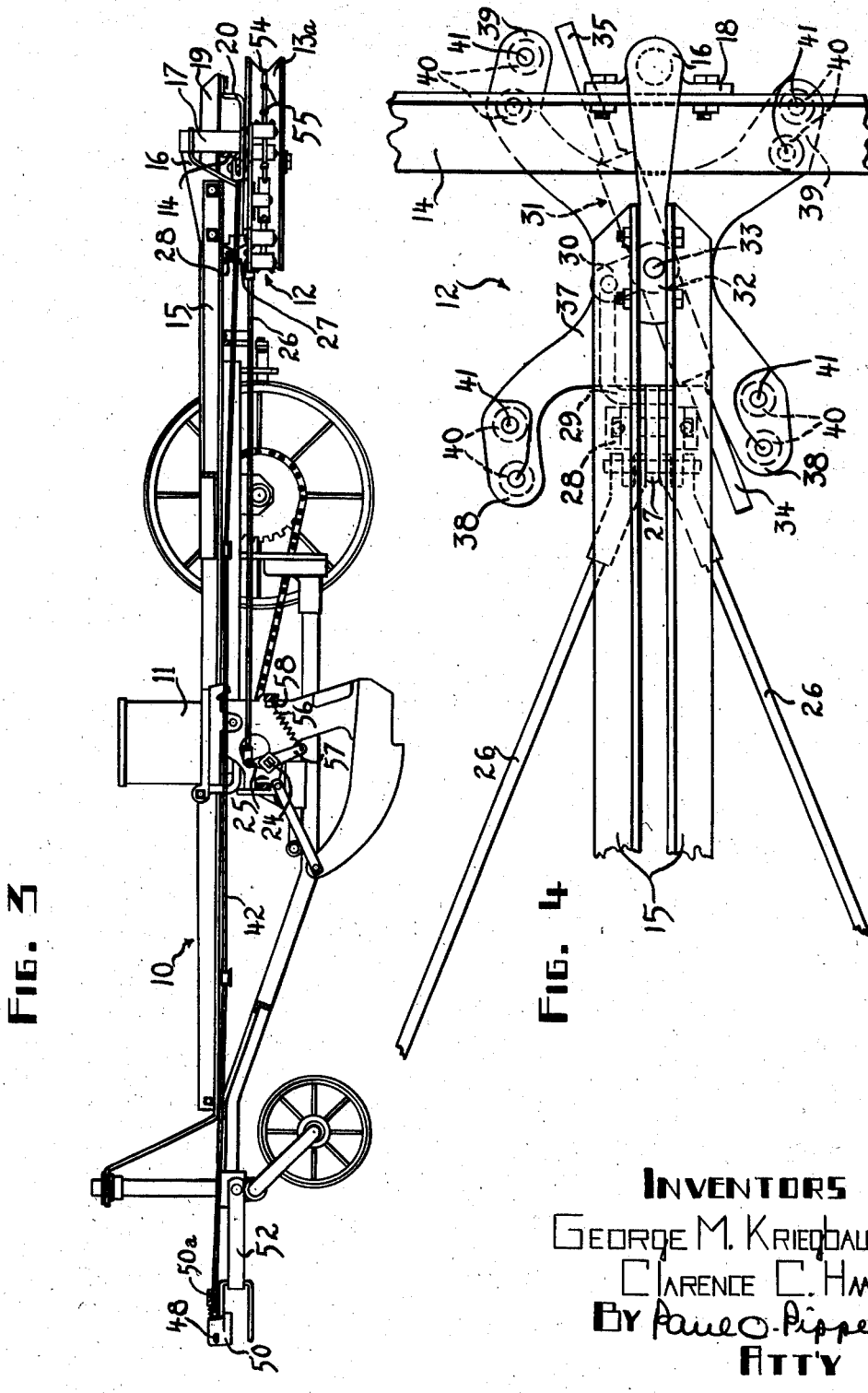

Patented Sept. 15, 1942

2,296,209

UNITED STATES PATENT OFFICE 2,296,209

PLANTER

George M. Kriegbaum and Clarence C. Haas, Richmond, Ind., assignors to International Harvester Company, a corporation of New Jersey Application May 10, 1941, Serial No. 392,830

9 Claims. (Cl. 111—48)

This invention relates to a planter. More specifically it relates to a planter of the check-wire type adapted to be pulled by and in trail-behind relationship to a tractor.

One difficulty with trail-behind planters of the check-wire type, which employ sheaves mounted at opposite sides of a planter and a check-wire trained about the sheaves and extending between them, is that of releasing the wire from the sheaves at the end of each row for turning. One solution of the problem is shown in the co-pending application of Alexus C. Lindgren, Serial No. 242,203, filed November 25, 1938, according to which check-wire sheaves are carried upon a beam rigidly secured to a tractor pulling a trail-behind planter, and a check-wire is released from the sheaves by turning of the beam with the tractor. However, with this construction there is a problem of freeing the check-wire from the planter after the wire is released from the sheaves. The Lindgren application shows a device for throwing the check-wire over the planter at the end of the row. This throwing device is necessarily somewhat complicated. Applicants have solved the problem by mounting the beam carrying the check-wire sheaves at the rear of the planter and controlling the beam so that it is always parallel to the rear of the tractor.

An object of the present invention is to provide an improved planter.

A further object of the present invention is to provide an improved planter of the check-wire type adapted to be connected in trail-behind relationship to a tractor.

A further object is the provision of a planter which embodies a novel position for the check-head mechanism so that the check-head mechanism itself may be simplified.

According to the present invention, a planter which is pivotally connected to a tractor in trail-behind relationship thereto has a transversely extending beam pivotally mounted at the rear of the planter and carrying check-wire sheaves at its ends at opposite sides of the planter. The beam is itself connected to the tractor, so that turning of the tractor with respect to the planter, as at the end of a row, produces a corresponding turning movement of the beam, and the check-wire drops from the sheaves. The planter is provided with a centrally positioned checking mechanism which engages the section of the check-wire passing between the sheaves.

In the drawings:

Figure 2 is a plan view of the planter during turning;

Figure 4 is a plan view, showing in detail the checking mechanism and associated parts;

Figure 5 is a sectional view of the same structure taken along the line 5—5 of Figure 1; and, Figure 6 is a sectional view taken along the line 6—6 of Figure 2.

Figure 1:
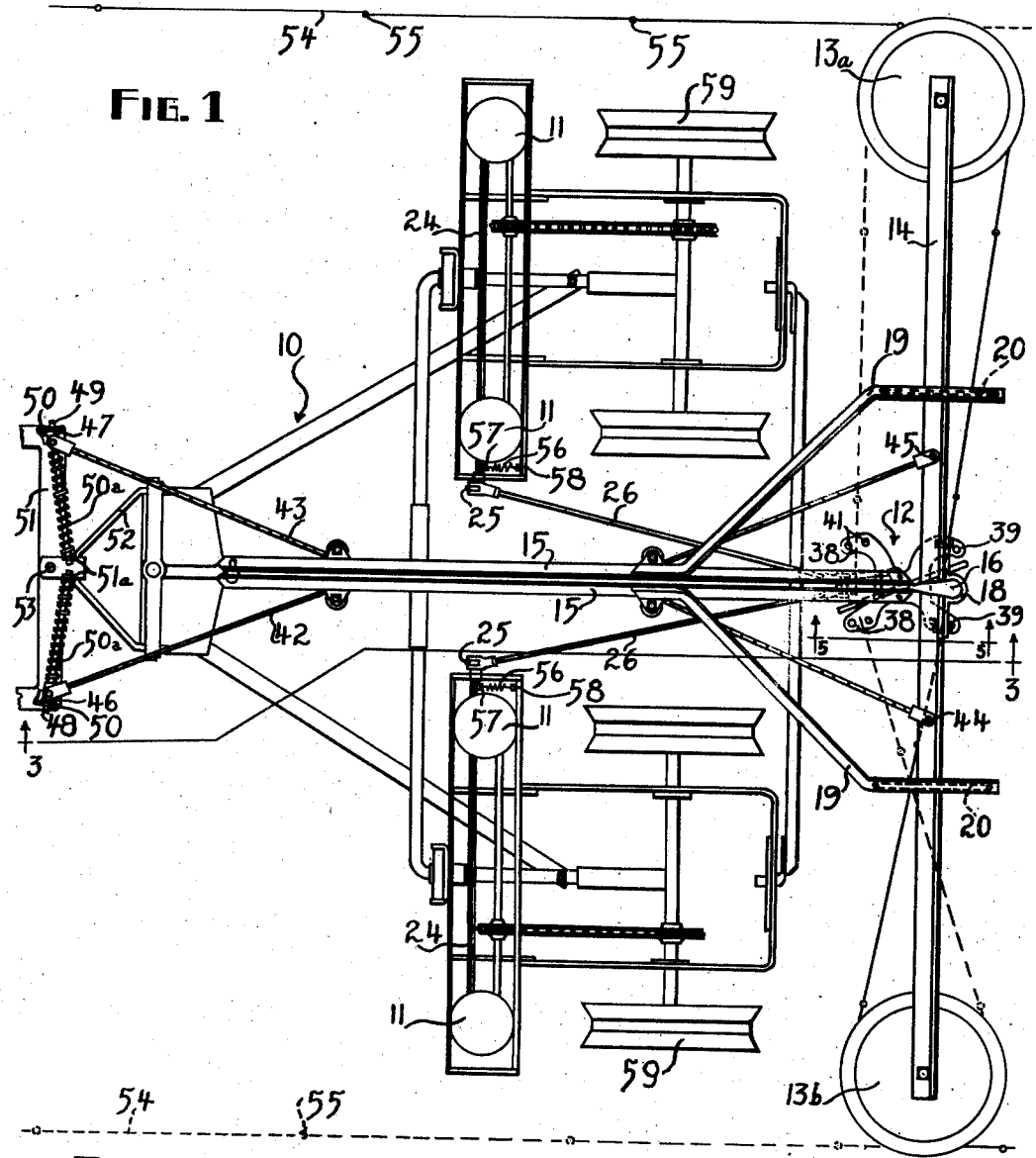
Figure 1 is a plan view of the planter of the present invention in normal planting position.
Figure 3:
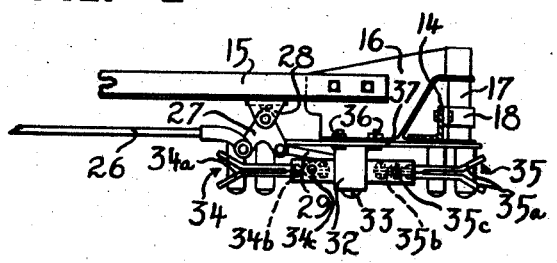
Figure 3 is a side sectional view of a planter taken along the line 3—3 of Figure 1.

The planter of the present invention comprises a frame 10, planting units 11 mounted thereon, a check-wire mechanism 12, and check-wire sheaves 13a and 13b carried at opposite sides of the planter on the ends of a beam 14 mounted at the rear of the planter.

The frame 10 includes two central, longitudinally extending angle members 15, between the rear ends of which is secured a casting 16. The casting has a vertical bearing portion 17, to which is pivotally connected the beam 14 by means of a strap 18. Angle members 19 are secured to the angle members 15 and extend outwardly and rearwardly and have parts 20 secured beneath their rearward portions so as to support the beam 14 and prevent it from dropping off the vertical bearing portion 17. The parts 20 also serve to limit the angular movement of the beam 14 with respect to the planter frame.

The planting mechanism 11 is not shown in detail, since, per se, it forms no part of the present invention. However, it may be substantially as shown in the patent to Ford 1,443,173, January 23, 1923, except that in the present case the planter is provided with check-wire mechanism 12 presently to be described, which is considerably spaced from rock-shafts 24 controlling the check-valve mechanism instead of directly connected with rock-shafts as in the Ford patent. Each rock-shaft 24 carries an arm 25 to which one end of a pair of links 26 is connected. The other end of the links is connected, as shown in Figures 4 and 5, to a rockable member 27 pivotally carried in a bracket 28 secured to the under-side of the angle members 15. A link 29 has one end connected to the rockable member 27 and the other end, to an extension 30 forming part of a checking member 31 pivotally supported by a central bearing portion 32 upon a bolt 33 journaled in the casting 16. The checking member 31 carries a front check-fork 34 and a rear check-fork 35, which is formed of two members 35a having spaced portions adapted to receive a check-wire, the members being secured as at 35b about a pin 35c pivotally mounting the fork 35 in the checking member 31. The check-fork 34 is similarly formed. Secured to the underside of the casting 16 by means of bolts and nuts 36 is a plate 37 having toward the front a pair of spaced arms 38 and toward the rear a pair of spaced arms 39. A pair of rollers 40 is rotatably mounted upon the under-side of the plate 37 by means of pins 41. Control connections 42 and 43 in the form of wires are secured respectively at points 44 and 45 on the sheave-carrying beam 14 on opposite sides of its pivotal mounting on the casting 16. The forward ends of the connections are attached to slide pieces 46 and 47 slidably mounted on rods 48 and 49. One end of the rods is supported in upstanding parts 50 secured at the ends of a draw-bar 51 secured at the rear of a tractor, not shown. The other end of the rods is supported in upstanding parts 51a forming part of a hitch means 52 secured at the front of the planter frame 10 and pivotally connected at 53 to the draw-bar 51. The slide pieces 46 and 47 are normally yieldably held in contact with upstanding parts 50 by coil springs 50a mounted on the rods 48 and 49.

During operation, the planter is drawn over the ground by means of the tractor, a check-wire 54 being received over sheave 13a at the right of the planter and passed across to sheave 13b at the left of the planter, as shown in full line. The check-wire is guided through the check-fork by means of the rollers 40 on the arms 39 through which it passes and carries buttons 55 which engage the rear check-fork 35. Engagement of the check-fork by a button 55 causes a clockwise movement of the checking member 31, which, acting through the extension 30, the link 29, the rockable member 27, the links 26, and the arms 25, causes an oscillation of the rock-shafts 24 and a consequent dropping of seed for planting. The checking member 31 is returned to its original position by springs 56 connecting arms 57 on the planter rock-shafts 24 and brackets 58 secured to the planter frame 10. When the end of a planting row is reached, the tractor is turned to the left, as indicated by the change in position of the draw-bar 51 in Figure 2. Thus, there is a pull exerted on the connection 43 greater than that exerted on the connection 42, and the resultant greater pull exerted on the point 45 on the sheave support 14 causes the sheave support to turn in the same direction with respect to the planter as the tractor draw-bar 51 is turned. Thus due to the turning of the sheave support 14, there is a sufficient loosening of the check-wire 54 for it to fall to the ground, the pivotal mounting of the forks in the checking member 31 allowing the outer end of the check-forks to drop and to release the check-wire. When the turn has been completed, the check-wire is applied, as shown in dotted lines, so that it is received at the left side of the planter over the sheave 13b and passes to the sheave 13a at the right side of the planter. It is guided between the rollers 40 on the arms 38 and engages the front check-fork 34. The buttons 55 actuate the front check-fork 34 in the same way that they actuate the rear check-fork 35. A clockwise movement of the checking member 31 results from engagement with the buttons 55 by the front check-fork 34, and the planting mechanisms 11 are caused to drop seeds as previously described. When the end of a row is reached, the tractor is turned to the right with respect to the planter, and there is an increased pull on the control connection 42 in the manner shown in Figure 2 for the increased pull on the connection 43. The result is an increased pull on the point 44 of the sheave support 14 and a consequent turn to the right of the sheave support. Thus the check-wire 54 becomes loose and drops from the sheaves. Upon completion of the turn, the check-wire 54 is trained over the sheaves and engaged with the checking mechanism in the manner shown in full lines in Figure 1, and planting is resumed as originally described.

It will be observed from the foregoing description that the planter forming the present invention has many novel features embodying advantages. One feature is the pivotal mounting of the sheave-carrying support at the rear of the planter and the connection of this support with the tractor so that, when a turn of the tractor is made, a corresponding turn of the sheave support results and the check-wire is loosened sufficiently to fall at the rear of the planter. Thus the check-wire is completely clear of the planter. Of course, the check-wire would be released on turning of the tractor, if the sheaves were mounted directly on the planter rather than on a beam pivotally mounted on the planter. The disadvantage to such an arrangement is that it is difficult to aline the planter with the line of planting and so to bring the line between the sheaves at right angles to the line of planting, this being necessary for setting of the check-wire stakes. Since it is easy to aline the tractor with the line of planting, the sheaves may be carried directly on the tractor or on a beam mounted on the tractor as in the aforementioned Lindgren application. In the present application, the sheaves are connected with the tractor by being mounted on a beam which is pivotally mounted on the planter and connected to the tractor.

Another novel feature is the yielding connection of the control connections 42 and 43 to the tractor draw-bar through the sliding elements 46 and 47, the rods 48 and 49, and springs 50a. The springs are stiff enough so that even slight turning movement of the tractor during planting of a row, due to obstructions or unevenness in the ground, transmits a corresponding movement to the sheave support 14. However, when the sheave support strikes the stops formed by the connections of the parts 20 to the angle members 19, the springs 50a yield, permitting the elements 46 and 47 to slide along the rods 48 and 49, and the tractor to have greater turning movement. Of course, a limiting of the turning of the sheave support 14 is provided so that the sheave will not strike wheels 59 of the planter.

Another novel feature of the present invention is the provision of a checking mechanism which is located centrally between check-wire sheaves at opposite sides of the planter so as to receive a check-wire as it is passed from across the planter from one sheave to another. The advantage in this arrangement is that only a single checking mechanism is required between the sides of the planter, rather than two separate checking mechanisms at opposite sides of the planter. This makes possible another novel feature, which is a single checking member which carries a check-fork at each end, one of which engages the check-wire as it passes in one direction across the planter, and the other of which engages the check-wire as it passes in the other direction across the planter.

It is intended that the invention be limited only within the scope of the appended claims.

What is claimed is:

1. In combination, a draft means, a planter pivotally connected in trail-behind relationship to the draft means and comprising a frame, planting mechanism mounted thereon, check-head mechanism mounted centrally on the frame, means connecting the check-head mechanism and the planting mechanism for causing actuation of the check-head mechanism to effect operation of the planting mechanism, a support pivotally mounted between its ends on a central point of the frame, check-wire sheaves rotatably mounted at the ends of the support and positioned at opposite sides of the frame and the check-head mechanism, a check-wire trained about the sheaves and engaging the check-head mechanism, and means connecting the support and the draft means for causing a turning in one direction of the draft means with respect to the planter to effect a turning in the same direction of the support with respect to the planter.

2. In combination, a draft means, a planter pivotally connected in trail-behind relationship to the draft means and comprising a frame, planting mechanism mounted thereon, check-head mechanism mounted centrally on the frame, means connecting the check-head mechanism and the planting mechanism for causing actuation of the check-head mechanism to effect operation of the planting mechanism, a support pivotally mounted between its ends on a central point of the frame, check-wire sheaves rotatably mounted at the ends of the support and positioned at opposite sides of the frame and the check-head mechanism, a check-wire trained about the sheaves and engaging the check-head mechanism as it passes from one sheave to the other, and means connecting points on the draft means on opposite sides of the pivotal connection of the planter with the draft means with points on the support, respectively, on opposite sides of its pivot point on the planter frame.

3. In combination, a draft means, a planter pivotally connected in trail-behind relationship to the draft means and comprising a frame, planting mechanism mounted thereon, check-head mechanism mounted centrally on the frame, means connecting the check-head mechanism and the planting mechanism for causing actuation of the check-head mechanism to effect operation of the planting mechanism, a support pivotally mounted between its ends on a central point at the rear of the frame, check-wire sheaves rotatably mounted at the ends of the support and positioned at opposite sides of the frame and the check-head mechanism, a check-wire trained about the sheaves and engaging the check-head mechanism as it passes from one sheave to the other, and means connecting the support and the draft means for causing a turning in one direction of the draft means with respect to the planter to effect a turning in the same direction of the support with respect to the planter, whereby a turning of the sheave support causes loosening of the check-wire and dropping thereof from the sheaves to the ground at the rear of the planter.

4. In combination, a draft means, a planter pivotally connected in trail-behind relationship to the draft means and comprising a frame, planting mechanism mounted thereon, check-head mechanism mounted centrally on the frame, means connecting the check-head mechanism and the planting mechanism for causing actuation of the check-head mechanism to effect operation of the planting mechanism, a support pivotally mounted between its ends on a central point of the frame, check-wire sheaves rotatably mounted at the ends of the support and positioned at opposite sides of the frame and the check-head mechanism, a check-wire trained about the sheaves and engaging the check-head mechanism, control connections extending from the sheave support to the draft means, means attaching the connections to the sheave support at opposite sides of its pivot point on the planter frame, and means yieldably attaching the control connections to the draft means at opposite sides of the pivotal connection of the planter with the draft means, whereby a turning of the draft means in one direction with respect to the planter causes a turning of the sheave support in the same direction with respect to the planter, and the yieldable attachment of the control connections to the draft means permits a limiting of the turning of the sheave support without a limiting of the turning of the draft means.

5. In combination, a draft means, a planter pivotally connected in trail-behind relationship to the draft means and comprising a frame, planting mechanism mounted thereon, check-head mechanism mounted centrally on the frame, means connecting the check-head mechanism and the planting mechanism for causing actuation of the check-head mechanism to effect operation of the planting mechanism, a support pivotally mounted between its ends on a central point of the frame, check-wire sheaves rotatably mounted at the ends of the support and positioned at opposite sides of the frame and the check-head mechanism, a check-wire trained about the sheaves and engaging the check-head mechanism, control connections extending from the sheave support to the draft means, means attaching one control connection to the sheave support at one side of its pivot point on the planter frame, means yieldably attaching the said one control connection to the draft means at the same side of the pivotal connection of the planter with the draft means and permitting movement of the said one control connection generally in a direction toward the said pivotal connection of the planter with the draft means, means attaching the other control connection to the sheave support on the side of its pivot point on the planter frame opposite the attachment of the said one control connection, and means yieldably attaching the said other control connection to the draft means at the side of the pivotal connection of the planter with the draft means opposite the yieldable attachment of the said one control connection with the draft means and permitting movement of the said other control connection in a direction generally toward the said pivotal connection of the planter with the draft means, whereby a turning of the draft means in a certain direction with respect to the planter produces a turning of the sheave support in the same direction with respect to the planter, and the yieldable attachment of the control connections to the draft means permits a limiting of the turning of the sheave support without a limiting of the turning of the draft means.

6. In combination, a tractor having a drawbar, a planter positioned in trail-behind relation to the tractor and comprising a frame, planting mechanism mounted on the frame, check-head mechanism mounted on the frame, a support pivotally mounted between its ends on the frame, check-wire sheaves rotatably mounted adjacent the ends of the sheaves, and a check-wire trained about the sheaves and engaging the check-head mechanism, hitch means secured to the front of the frame and pivotally connected to a midpoint of the tractor draw-bar, rods supported at one end on the hitch means adjacent the connection with the tractor draw-bar and at the other end on the ends of the draw-bar, control connections extending from points on the tractor draw-bar on opposite sides of the connection of the hitch means with the draw-bar to points on the sheave support on opposite sides of the pivotal mounting of the sheave support on the planter frame, means attaching the connections to the said points on the sheave supports, means slidably attaching the control connections to the rods adjacent the end supported at the ends of the tractor draw-bar, coil springs mounted on the rods and urging the attaching means for the control connections in a direction toward the ends of the tractor draw-bar, whereby turning of the tractor with respect to the planter causes a turning in the same direction of the sheave support with respect to the planter, and the yielding attachment of the control connections to the tractor draw-bar, by virue of the action of the coil springs against the slidable mounting of the control connections to the rods, permits a limiting of the turning of the sheave support without a limiting of a turning of the tractor.

7. In combination, a draft means, a planter pivotally connected in trail-behind relationship to the draft means and comprising a frame, planting mechanism mounted thereon, check-head mechanism mounted on the frame, means connecting the check-head mechanism and the planting mechanism for causing actuation of the check-head mechanism to effect operation of the planting mechanism, a support pivotally mounted between its ends on a point at the rear of the frame, check-wire sheaves rotatably mounted at the ends of the support, a check-wire trained about the sheaves and engaging the check-head mechanism, and means connecting the support and the tractor for causing a turning in one direction of the tractor with respect to the planter to effect a turning in the same direction of the sheave support with respect to the planter, whereby turning of the sheave support causes loosening of the check-wire and dropping thereof from the sheaves to the ground at the rear of the planter.

8. In combination, a draft means, a planter pivotally connected in trail-behind relationship to the draft means and comprising a frame, planting mechanism mounted thereon, check-head mechanism mounted on the frame, means connecting the check-head mechanism and the planting mechanism for causing actuation of the check-head mechanism to effect operation of the planting mechanism, check-wire sheaves mounted at the rear of the frame, a check-wire trained about the sheaves and engaging the check-head mechanism, and means connecting the draft frame and a sheave for shifting the sheave with respect to the planter frame upon turning of the draft means for dropping the check-wire to the ground.

9. In combination, a draft means, a planter pivotally connected in trail-behind relationship to the draft means and comprising a frame, planting mechanism mounted thereon, check-head mechanism mounted on the frame, means connecting the check-head mechanism and the planting mechanism for causing actuation of the check-head mechanism to effect operation of the planting mechanism, support means shiftably mounted on the frame at the rear thereof, check-wire sheaves rotatably mounted on the support means and positioned in transverse spaced relationship to one another, a check-wire trained about the sheaves and engaging the check-head mechanism, and means connecting the draft means and the support means for shifting the support means with respect to the planter upon turning of the planter for dropping the check-wire to the ground.

GEORGE M. KRIEGBAUM.
CLARENCE C. HASS.